United States Patent [19]
Smith

[11] Patent Number: 5,078,050
[45] Date of Patent: Jan. 7, 1992

[54] HOT PLATE CARRIER

[75] Inventor: Donald P. Smith, Dallas, Tex.

[73] Assignee: Patentsmith, II, Inc., Dallas, Tex.

[21] Appl. No.: 395,746

[22] Filed: Aug. 18, 1989

[51] Int. Cl.$^5$ .................. A21C 13/00; A21D 8/02; H05B 3/36

[52] U.S. Cl. .......................... 99/483; 99/422; 99/432; 99/467; 99/DIG.15; 126/281; 219/387; 219/521

[58] Field of Search ............ 99/339, 340, 422, 426, 99/432, 450, 483, DIG. 15; 206/545, 548, 549; 219/386, 387, 521, 385; 126/275 R, 281

[56] References Cited

U.S. PATENT DOCUMENTS

| | | |
|---|---|---|
| D. 267,994 | 2/1983 | Luzich . |
| D. 283,589 | 4/1986 | Erlandson et al. . |
| D. 285,517 | 9/1986 | Paulus . |
| D. 287,795 | 1/1987 | Streepy . |
| D. 296,862 | 7/1988 | Beltz . |
| D. 297,297 | 8/1988 | Lacey . |
| 2,078,650 | 4/1947 | Clark ................................. 219/387 |
| 3,721,803 | 3/1973 | DiStefano ........................... 219/387 |
| 3,987,719 | 10/1976 | Kian ..................................... 99/422 |
| 4,184,421 | 1/1980 | Ahlgren .............................. 99/450 |
| 4,367,243 | 1/1983 | Brummett et al. .................. 99/432 |
| 4,378,729 | 4/1983 | Pierick ........................... 99/DIG. 15 |
| 4,384,513 | 5/1983 | Pierick .............................. 26/275 R |
| 4,400,404 | 8/1983 | Persi . |
| 4,494,654 | 1/1985 | Gunther et al. . |
| 4,494,786 | 1/1985 | Paulus et al. . |
| 4,500,276 | 2/1985 | Cherkasky et al. . |
| 4,556,046 | 12/1985 | Riffel et al. . |
| 4,632,836 | 12/1986 | Abbott et al. . |
| 4,643,167 | 2/1987 | Brewer . |
| 4,676,151 | 6/1987 | Gorsuch et al. ..................... 99/450 |
| 4,716,819 | 1/1988 | Beltz . |
| 4,806,736 | 2/1989 | Schirico . |
| 4,816,646 | 3/1989 | Solomon et al. . |
| 4,865,219 | 9/1989 | Logan et al. ................. 99/DIG. 15 |
| 4,916,290 | 4/1990 | Hawkins ............................. 219/521 |
| 4,933,534 | 6/1990 | Cunningham et al. ............ 219/521 |
| 4,955,125 | 9/1990 | Steinman . |

*Primary Examiner*—Simone: Timothy F.
*Attorney, Agent, or Firm*—Crutsinger & Booth

[57] ABSTRACT

A carrier for a partially baked dough product having a bottom crust and a moist topping including a vented container for the partially baked dough product and a heater being adapted to initially heat the bottom of the partially baked dough product to a temperature greater than 250° F. to finish baking the crust of the dough product, and to maintain the temperature of the crust greater than the temparature of the moist topping. The vented container is formed to exhaust moist air from the interior of the container while maintaining the temperature of air adjacent the moist topping on the dough product above the dewpoint of air in the container to prevent condensation of moisture and to draw air from outside the container to expel moisture from adjacent the bottom crust.

20 Claims, 7 Drawing Sheets

HOT PLATE CARRIER

TECHNICAL FIELD

The hot plate carrier relates to improvements in packaging and containers for delivery of hot baked cereal or dough products such as pizza.

BACKGROUND OF INVENTION

Home delivery and take-out food service is escalating. However, heretofore the flavor, texture and overall quality of food products and particularly baked dough products deteriorates rapidly after the product is removed from the oven. Cooling of the product and absorption of moisture into the dough product are major factors which contribute to the deterioration of the quality and flavor of the product.

U.S. Pat. No. 4,632,836 discloses a pizza preparation and delivery system including a vehicle having a driver station and a kitchen area. Orders received by a mobile are prepared in the kitchen area of the vehicle while the vehicle is enroute to the delivery destination.

U.S. Pat. No. 4,806,736 discloses a heated delivery bag having an electric heating unit mounted inside a box adapted to be connected to an external power source, such as the cigarette lighter socket of a vehicle for maintaining pizza warm while it is being delivered. The temperature inside the portable container is maintained between 165° and 180° F. by a thermostat which activates the heating element when the temperature falls below 165° F. and deactivates the heating element when the temperature climbs to about 180° F.

U.S. Pat. No. 4,816,646 discloses a food delivery hot bag with electric hot plate for maintaining freshly baked pizza hot while being delivered.

While significant advances have been made in the area of take-out and home delivery food service, heretofore it has been difficult to maintain the "fresh baked" flavor and quality of products during the time required for delivery.

SUMMARY OF INVENTION

The invention disclosed herein relates to a method and apparatus for preparing and delivering baked dough products having a bottom crust and moist topping. The dough product is preferably partially baked and then placed in a portable carrier having a heated plate mounted therein which is particularly adapted for providing additional heat to the bottom of the partially baked dough product to finish baking the crust and to maintain the temperature of the crust greater than the temperature of the moist topping to prevent condensation of moisture in the portable carrier. The container is preferably vented for exhausting moist air from the interior of the container such that optimum texture, flavor and odor are maintained when the product is delivered.

A primary object of the invention is to provide a portable carrier for a baked dough product in which the "fresh baked" flavor of the product is optimized by providing a hot heat conductive plate in heat exchange relation with a partially baked food product such that the product is baking while enroute to the consumer.

DESCRIPTION OF DRAWINGS

Drawings of a preferred embodiment of the hot plate carrier are annexed hereto so that the invention may be better and more fully understood, in which.

Numeral references are employed to designate like parts throughout the various figures of the drawings.

DESCRIPTION OF A PREFERRED EMBODIMENT

Figure 1:
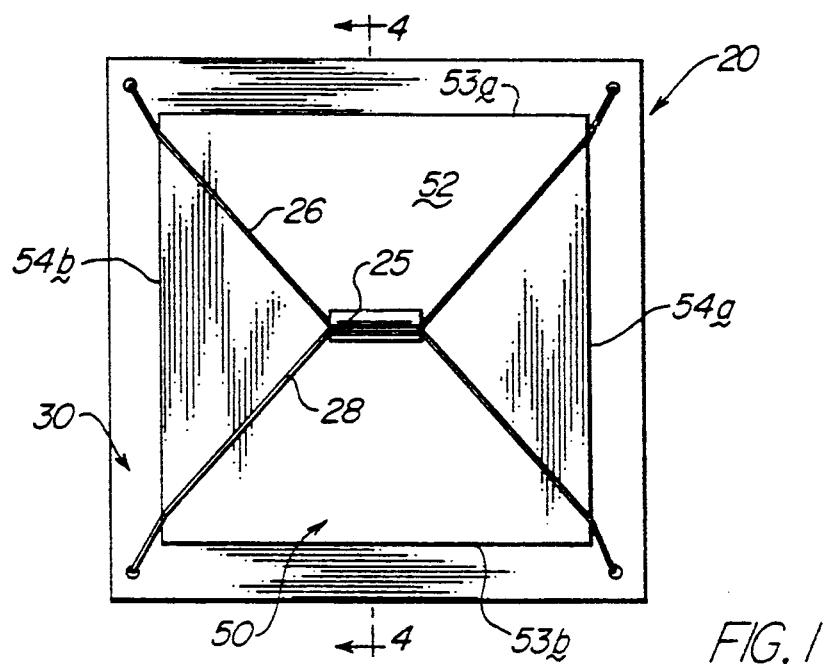
FIG. 1 is a top plan view of the hot plate carrier.
Figure 2:
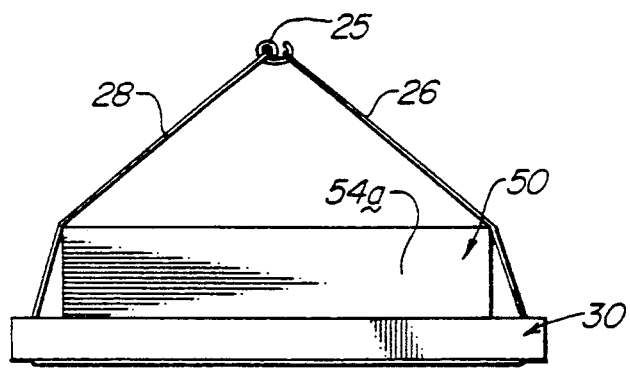
FIG. 2 is an end view thereof.
Figure 3:
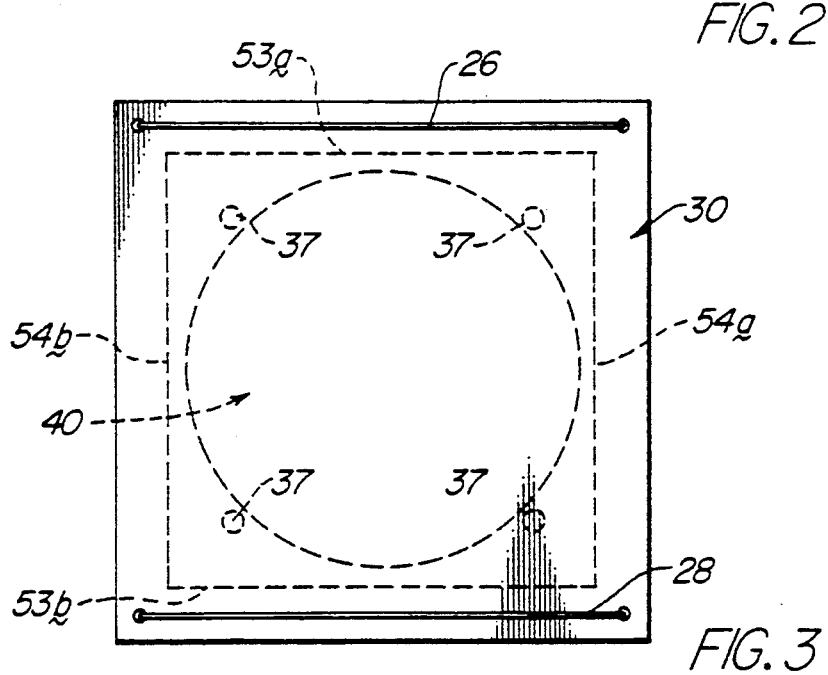
FIG. 3 is a bottom plan view thereof.

Referring to FIGS. 1-4 of the drawing, the numeral 20 generally designates a carrier for a dough product 100 having a bottom crust 102 and a moist topping 104. Carrier 20 comprises a base plate 30, a heat conductive plate 40 and a vented container 50.

As will be hereinafter more fully explained, base plate 30 preferably comprises a rigid sheet having an upper surface 32 and a lower surface 34 for supporting hot plate 40 and container 50. Upwardly extending ribs 36 are formed on upper surface 32 for spacing the lower surface 44 of plate 40 away from the upper surface 32 to provide space 35 therebetween. Locator pins 37 extend upwardly from the upper surface 32 of base 30 adjacent the periphery of plate 40 for locating plate 40 generally centrally of base 30. In the illustrated embodiment, post 37 comprise threaded screws extending through openings formed in base 30.

A handle 25 is secured by ropes 26 and 28 to base plate 30. In the illustrated embodiment, ropes 26 and 28 extend through apertures formed adjacent corners of base plate 30, portions of each rope extending below the bottom surface 34 of the base plate such that base plate 30 is supported by ropes 26 and 28 and may be lifted by applying an upward force on handle 25. In the illustrated embodiment, handle 25 is provided with a hook portion 25a and a passage 25b permitting rope 26 to be disengaged from handle 25 to facilitate positioning cover 50.

Figure 5:
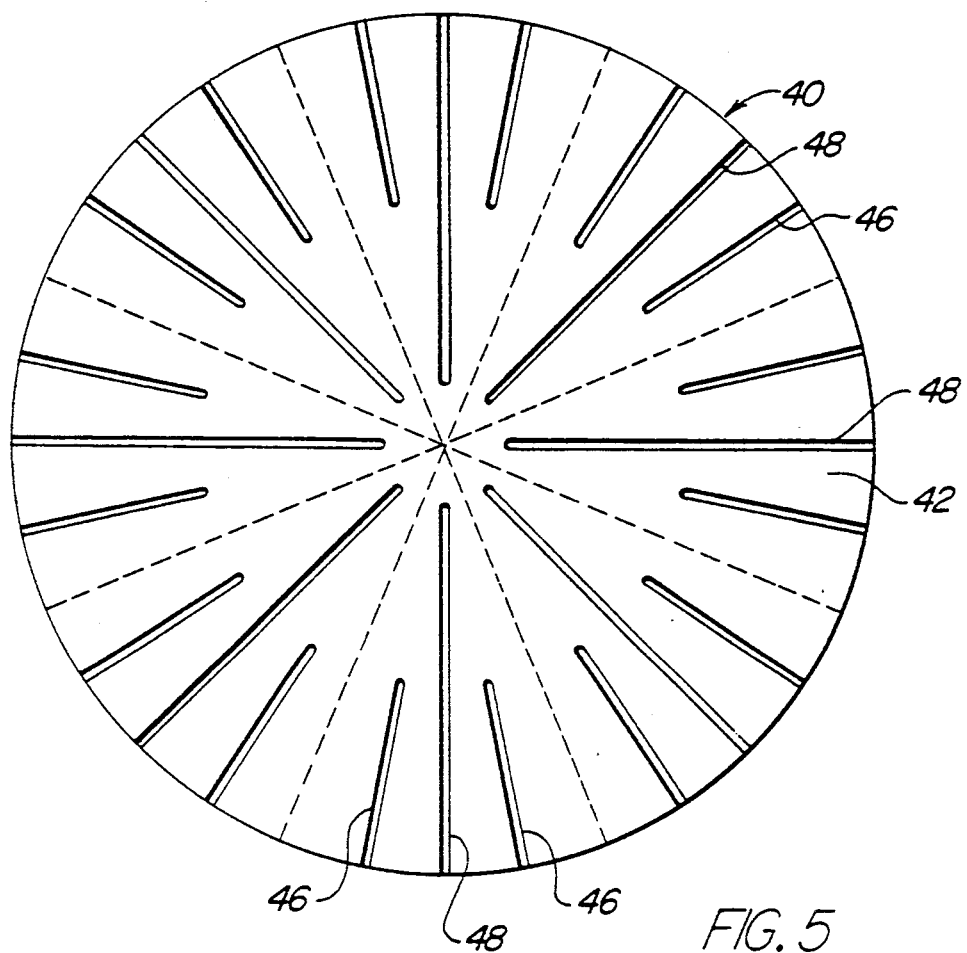
FIG. 5 is a top plan view of a hot plate.
Figure 6:
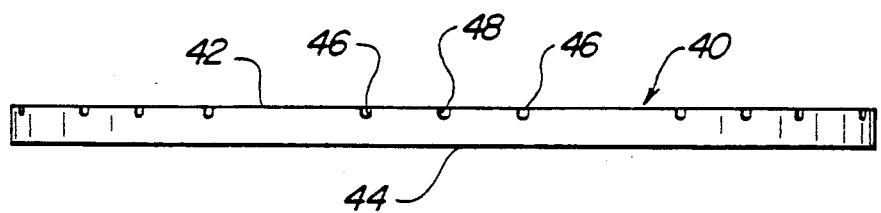
FIG. 6 is a side elevational view of the hot plate shown in FIG. 5.

As best illustrated in FIGS. 5 and 6 of the drawing, the upper surface 42 of heat conductive plate 40 has generally radially extending long grooves 48 formed therein extending from a position adjacent the center of surface 42 outwardly to the periphery of surface 42. In the illustrated embodiment, short grooves 46 and long grooves 48 are provided to permit the flow of air through the grooves in a direction generally radially relative to the upper surface 42 of plate 40.

Figure 4:
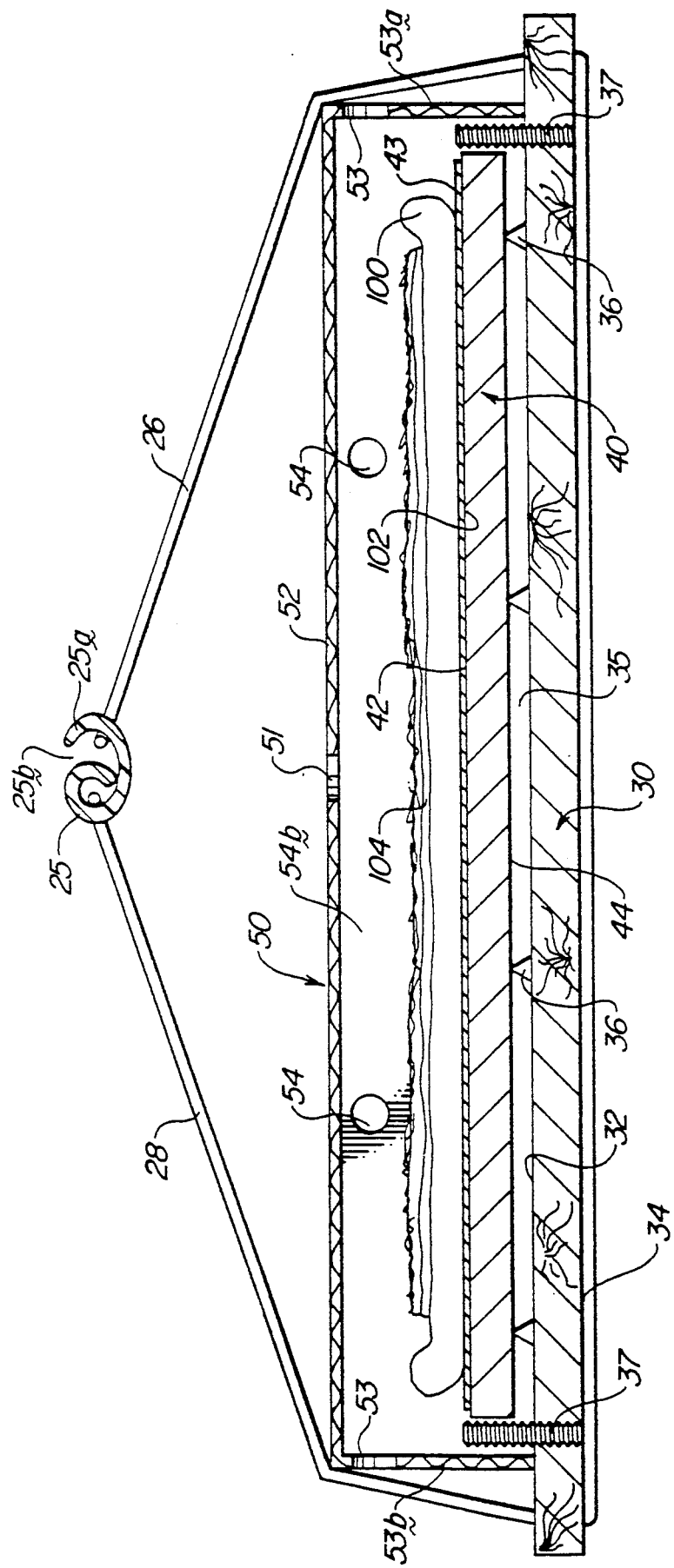
FIG. 4 is a cross-sectional view taken along line 4—4 of FIG. 1.

As best illustrated in FIG. 4 of the drawing, a thin sheet of aluminum foil or other thermal conductive material 43 is preferably secured to the upper surface 42 of plate 40. Sheet 43 may be replaced by a suitable non-stick coating if it is deemed expedient to do so to facilitate cleaning plate 40.

Figure 7:
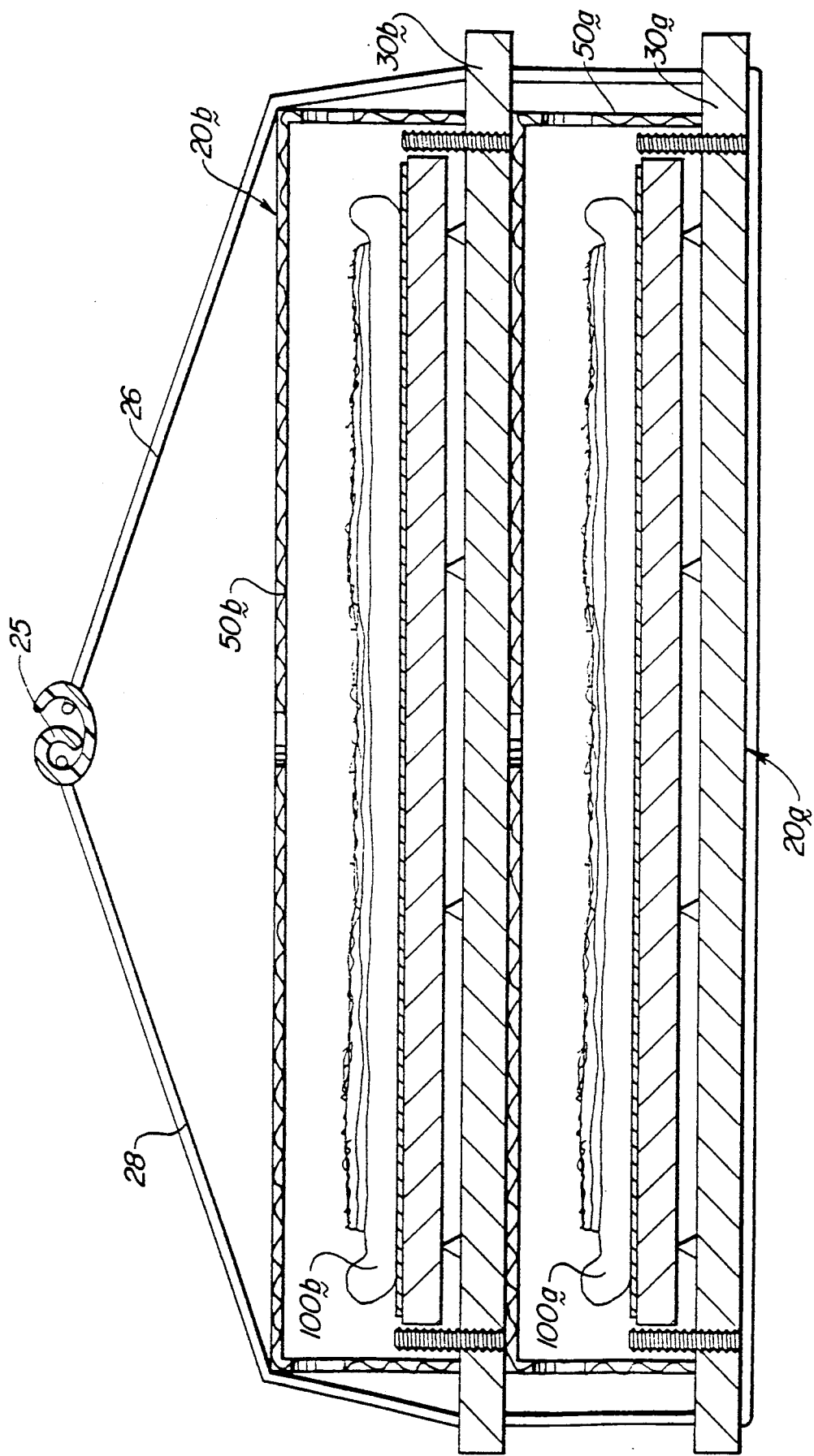
FIG. 7 is a cross-sectional view similar to FIG. 4 illustrating a pair of hot plate carriers.

In FIG. 7 of the drawing, a pair of carriers 20a and 20b are secured together for transporting as a unit.

Figure 8:
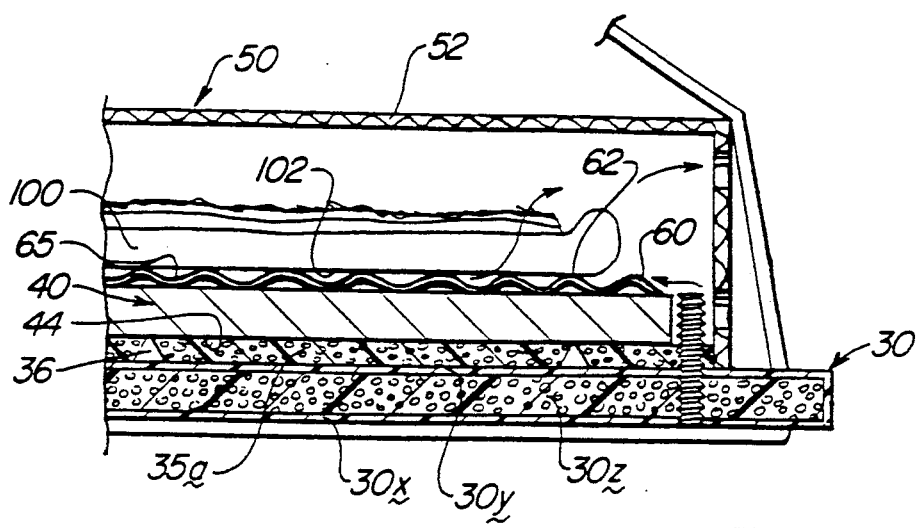
FIG. 8 is a fragmentary cross-sectional view similar to FIG. 4 of a modified form of the hot plate.

In the embodiment of the invention illustrated in FIG. 8 of the drawing, base plate 30 comprises spaced sheets 30x and 30y of rigid plastic material having a layer 30z of insulation material therebetween to provide an impervious thermal insulator having sufficient structural strength for supporting thermally conductive plate 40, container 50 and food product 100.

In the embodiment illustrated in FIG. 8 of the drawing, the space 35 between the upper surface 32 of base plate 30 and lower surface 44 of heated plate 40 is filled with insulation material 35a.

A corrugated sheet 60 of thermal conductor material is positioned between the upper surface 42 of heated plate 40 and bottom crust 102 of the dough product 100. Corrugated sheet 60 has upwardly extending ribs 62 with spaced grooves 65 extending therebetween forming passages to permit air flow below the lower surface of crust 102 for removing moisture to maintain crust 102 dry.

Container 50 may assume a variety of configurations but preferably is provided with a top 52, spaced side walls 53a and 53b and spaced end walls 54a and 54b. As illustrated in FIG. 4 of the drawing, top 52, sides 53a and 53b, and ends 54a and 54b form a generally rectangular cover around heated plate 40 and the food product 100. The container is preferably ventilated to exhaust moist air from the interior of the container while maintaining the temperature of air adjacent the moist topping 104 on the dough product 100 above the dewpoint of air in the container to prevent condensation of moisture on the dough product 100.

In the illustrated embodiment of FIG. 4, exhaust openings 51 are formed in top 52 and exhaust openings 53 are formed in side walls 53a and 53b while exhaust openings 54 are formed in end walls 54a and 54b. It should be appreciated that exhaust openings 51, 53 and 54 vent warm moist air from the interior of the container 50 adjacent top 52 thereof.

In the embodiment of the invention illustrated in FIG. 4 of the drawing, heated plate 40 is supported by generally conical shaped ribs 36 to provide an air space 35 between the lower surface 44 of heated plate 40 and the upper surface 32 of base plate 30 to minimize thermal conduction from plate 40 to base plate 30. The dough product 100, for example, a pizza is positioned in thermally conductive contact with the upper surface 42 of heated plate 40. Grooves 46 and 48 formed in the upper surface 42 of heated plate 40 permit the escape of steam which migrates toward the surface of the bottom crust 102. If plate 40 is heated to a temperature of, for example, greater than 250° F. and a partially baked dough product 100 is positioned thereon heat transferred from plate 40 to the dough product 100 will continue the process of baking the crust as heat is transferred from plate 40 to the dough product. Moisture liberated from dough product 100 is allowed to escape through grooves 46 and 48 into the interior of container 50. The moist heated air inside container 50 is vented through exhaust passages 51, 53 and 54.

Figure 11:
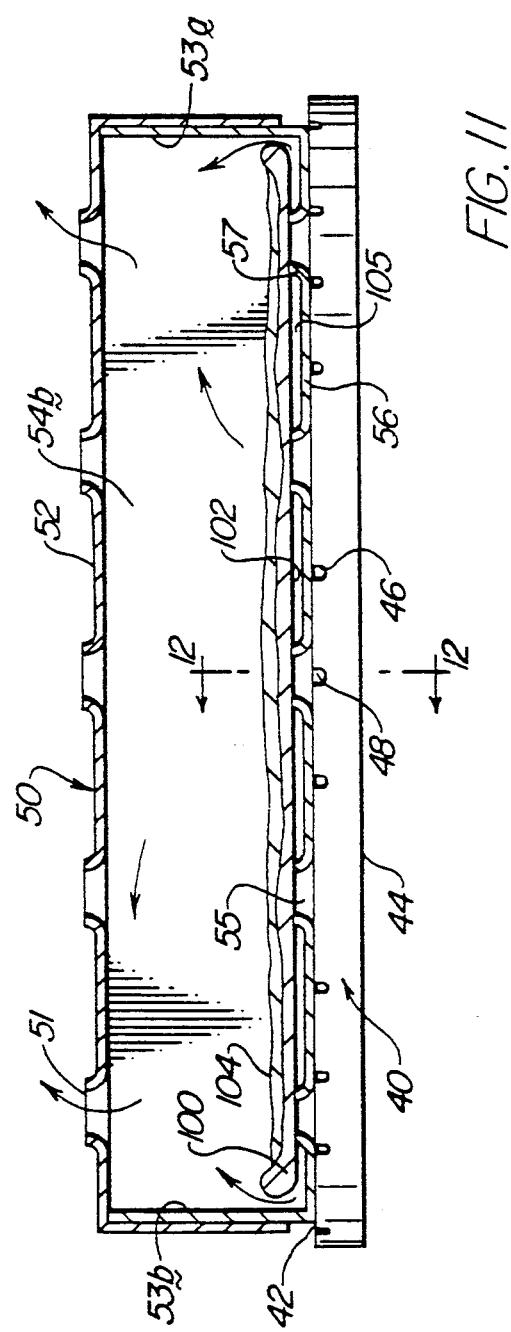
FIG. 11 is a cross-sectional view similar to FIG. 4 illustrating the cooperative relationship of a perforated container associated with a hot plate.

In the embodiment of the invention illustrated in FIG. 11 of the drawing, container 50 is provided with a bottom 56 having air inlet passages 55 formed therein. Inlet passages 55 are formed by piercing and deforming bottom surface 56 to provide an upwardly extending rim 57 around each passage 55, rims 57 being bridged by the bottom crust 102 of dough product 100 to provide space 105 between bottom crust 102 and the upper surface 56a of bottom 56 of container 50.

Figure 12:
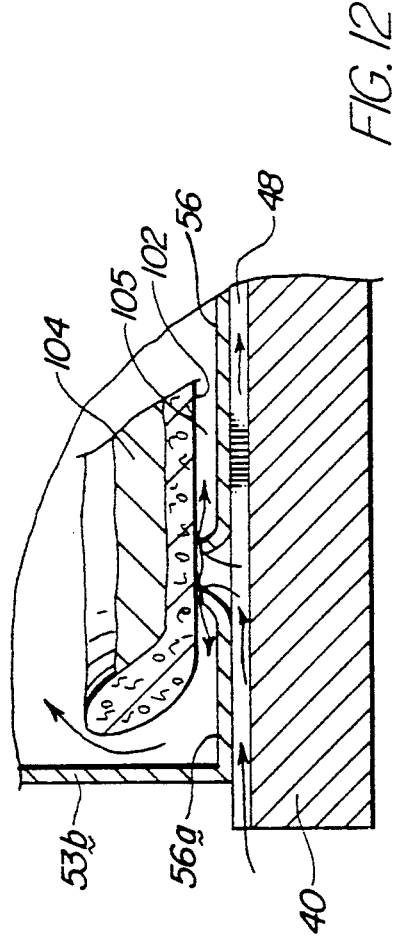
FIG. 12 is an enlarged fragmentary cross-sectional view taken along line 12—12 of FIG. 11.

As illustrated in FIG. 12 of the drawing, air is drawn through grooves 46 and 48 formed in the upper surface 42 of heated plate 40 and passes through passages 55 into the space 105 adjacent the lower surface 102 of the dough product 100. Moist air adjacent bottom crust 102 of food product 100 flows laterally and escapes around the periphery of dough product 100 and is evacuated through exhaust passages 51, 53 and 54 above the moist topping 104.

Figure 10:
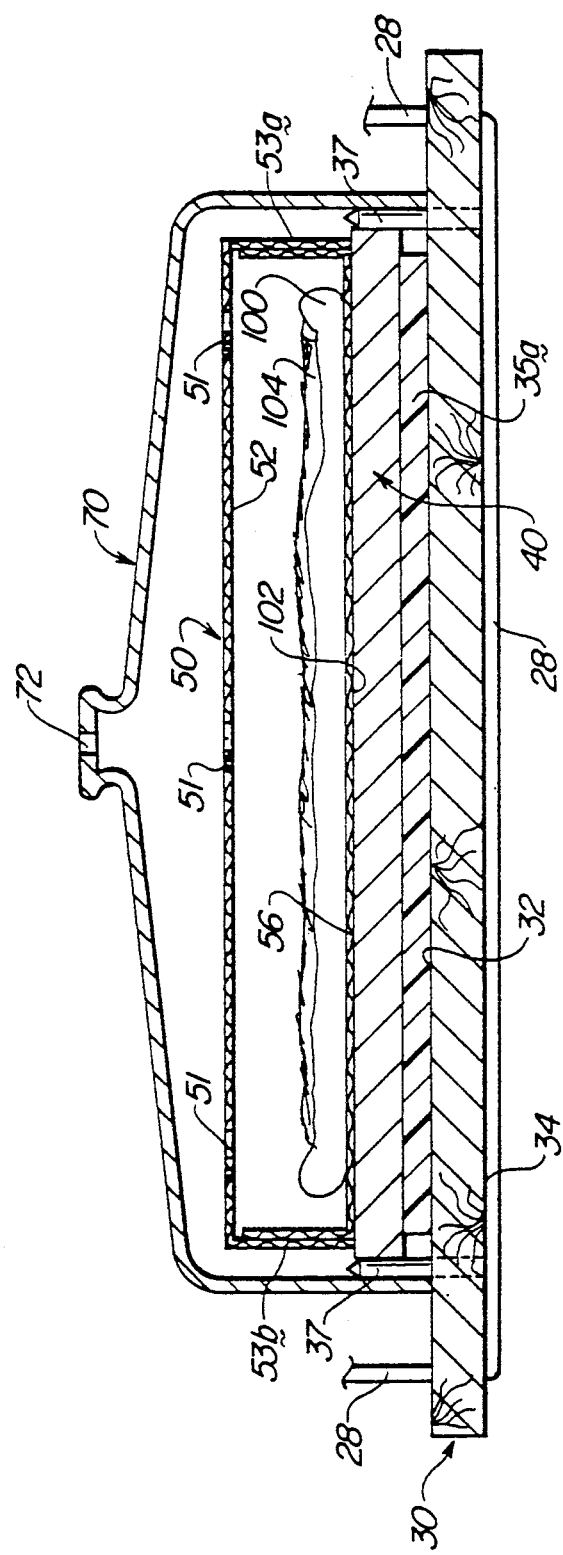
FIG. 10 is a cross-sectional view similar to FIG. 4 of a modified form of the hot plate carrier.

In the embodiment of the invention illustrated in FIG. 10 of the drawing, the carrier 20 is provided with an outer cover 70 having a vent opening 72 formed in the upper surface thereof.

In the embodiment of the invention illustrated in FIG. 10 of the drawing, it should be noted that vent openings 51 formed in container 50 are located on the opposite side of dough product 100 from the crust 102.

Dough product 100 is preferably partially baked when it is deposited in container 50 and positioned in heat transfer relation with heated plate 40. Heat transferred to the dough product 100 from heated plate 40 finishes the baking of the dough product and maintains the temperature of the product at an ideal serving temperature.

Figure 9:
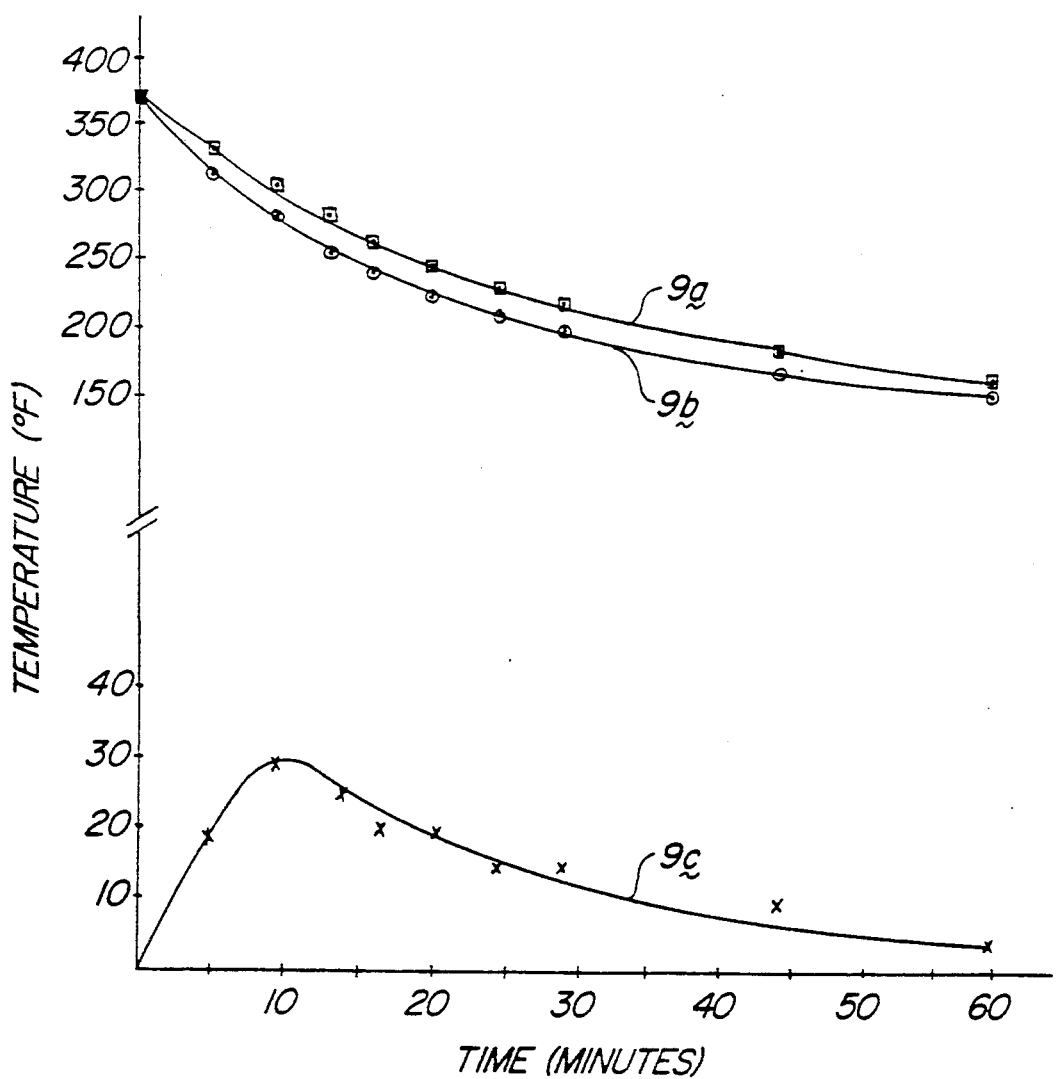
FIG. 9 is a graphic representation of temperature vs. time.

Referring to FIG. 9 of the drawing, the upper curve 9a illustrates empirical data regarding the cooling rate of an aluminum plate 40 having a thickness of one-half inch and a diameter of 15 inches heated to a temperature of 375°. Curve 9a illustrates the temperature vs. time of the aluminum plate without a pizza mounted thereon over a period of one hour.

Curve 9b illustrates the temperature of an identical aluminum plate having a pizza supported on the surface thereof over the same time interval of one hour. Curve 9c illustrates the temperature difference between the aluminum plate of curve 9a and the aluminum plate of curve 9b having a pizza mounted thereon over the time interval of one hour. It is noted that heat is initially transferred from plate 40 to the bottom crust 102 of food product 100 at a rather rapid rate for a period of time of about ten minutes to finish baking the bottom crust 102 while the heated plate 40 is cooling to a temperature of less than 300° F.

During the baking process the bottom crust 102 is formed as the crust dries and moisture migrates to the surface. As drying action of the crust continues to a serving temperature of about 160° provided that the air is circulated for removing the moisture as it migrates to the surface of the dough. However, in a sealed closed container, the temperature required to finish baking the product is substantially higher than that in a vented container.

The ultimate food service for a family where each member comes home tired and/or busy for the evening is home delivery of hot entree, perhaps plus fresh salad or soup. Daytime delivery to offices or lunches are similar.

Basically, the baking attains certain temperature end points. In products like bread, buns or pizza crust the crisp outer crust is in constant moisture exchange with the moist interior. In pizzas the crisp bottom crust is formed and maintained by an entirely different heating profile than the moist cheese, tomato paste, vegetable and meat toppings.

In baking bread, buns and similar products the moist leavened dough gels from pasty consistency to irreversible gel form in the range of 160° to 175° F. High gluten doughs can become undesirably tough at temperatures over 200 degrees in the thin layer under the crust or if heated for a long period of time. In microwave tough moist internal dough may result from overheating.

The texture, color, taste and odor of the crusts of such cereal products comes from heat reactions of drying, caramelization, and combination of these reactions which give a crisp brown crusts usually requires the outer layers of a product to reach over 300° F. These reactions are much slower at lower temperatures. Of course, crispness or lack of water plasticizing occurs only as the product is well above 212° F.

To form the usually desirable crust on the outside of moist dough products the outside must first dry sufficiently deeply so that the water wicking to the surface does not absorb the oven heat in evaporation.

The faster the heat is applied to the surface the thinner the crust can be, as it reaches crisping and browning temperature. It is this accelerated heat transfer rate at relatively low temperature as applied in forced convection baking and especially in air jet impingement which permits formation of thin crisp crusts.

In baking cereal products for the table ready market such as a retail bakery or restaurants supplying home delivery table ready meals, maintaining this freshly baked texture, odor, taste and appearance is very important.

However, the moist center continually supplies moisture which cools the product as it evaporates and softens the crisp crust. The "bite" in French bread or in a pizza crust demands dry crispness. The flavors and volatile odors from the crust are fugitive and need to be continually generated for full appreciation.

To enclose the product in a container causes the water vapor to be contained and to be absorbed by the dry crust. This makes the crust soft and if the high temperature baking is withdrawn the generation of volatile odor and flavor components is greatly reduced.

To bake and supply freshly baked cereal products with moist centers or moist surface portions with the crisp crusts and fresh texture, odor, and taste; the crust must be continually heated to disperse the water which wicks from the interior of the product and the temperature must be maintained high enough to keep any water vapor from condensing and toughening the crust.

To accommodate the widely varying times from the oven to the consumer in table ready meal service, the product should be baked as close to serving as possible and then maintained with controlled continual heat input to the crust.

For table ready service most hot foods should be served at 140° to 170° F. At this temperature range the water in a moist product migrates rapidly and the water vapor pressure is quite high so crust softening is rapid.

For breads with overall crust heating with hot air temperature over 170° F. is widely used. This air must be largely heated ambient air not moist recirculated air. Such low temperature does not replace the odor and taste of higher baking temperatures but can generally maintain crust texture. For comparison, one might compare the soft crust of usual packaged bread and buns with the freshly baked mini-loaf in a fine restaurant.

For baking and table-ready service of products like pizzas which have crisp crusts and exposed moist toppings special devices and methods are required to maintain product quality.

Heated plate 40 maintains crispness in a pizza crust by continually applying heat to the crust while retaining most of the water vapor over the topping.

However, since the crust will continue to bake and will become thick and hard if maintained too hot, the primary baking should be continued at a slower pace as long as possible and then the heat on the crust should be reduced. If the heat is gradually reduced the fresh flavor and odor will continue to be generated to be attractive to customers and to give only slightly less fresh baked appreciation.

To obtain the flexibility of the varying time between oven fresh and table ready the method of prebaking the toppings and at least partially baking the crust, then continuing the baking of the crust with gradually reducing temperature is desirable. This provides a result similar to that attained by shutting down the heat in an oven after the top of the product is baked and then letting the heat in the deck of the oven finish baking the crust while continuing to cool slowly to keep the pizza as good as possible.

The final baking temperature and the rate of oven cooling will be different for thin crisp pizzas, thick Chicago style pizza or pan pizzas and other types.

For delivery the most practical means of accomplishing this finish baking and hot holding is use of a hot plate 40 of sufficient heat capacity to finish baking the pizza 100 and a carrier 50 which provides insulation to retard further cooling of the plate for the holding phase of the delivery time. A cover 50 or 70 over the pizza 100 and the hot plate 40 to retain steam over the topping is essential. The cover 50 needs to have some insulating capability in cold areas to avoid steam condensation and water droplets. Moisture absorption into the cover can reduce water droplets.

Usually the pizzas 100 are taken from the oven and placed on a cutting board or in a cold pan for cutting. This cools the crust causing early sogginess. The pizza should be cut on the hot delivery plate 40. Even cutting in the baking pan when the pan is on a cold metal surface can be detrimental.

If the pizza 100 is baked on a plate or in a pan, this hot plate or pan is placed onto the finish baking and delivery plate 40 and the pizza 100 is cut on the plate or in the pan (using a chopper shaped knife).

The delivery plate 40 is preferably covered with a thin material 43 like aluminum foil, thin high temperature plastic sheet, or high temperature unwoven fabric which is used for cutting the pizza 100 when placed on the material 43 and then used to transfer the cut pieces to the delivery box or container 50.

A delivery box 50 of relatively thin dense material, as illustrated in FIG. 11, permits finish baking and holding on the hot delivery plate 40 by conducting heat through the bottom 56 of the conductive delivery box 50. The conductive delivery box illustrated in FIG. 11 will be hot to hand to the customer so handles, cool corners or other means are needed to facilitate handling.

The conductive delivery box 50 needs a cover, as illustrated in FIG. 10, over it and the hot delivery plate 40 while finish baking and holding for longer periods or in cold climates.

From the foregoing it should be apparent that the method of baking a leavened cereal product 100 includes the steps of placing it in close proximity to a hot covered and insulated plate 40 of sufficient heat capacity to continue some baking and as the plate 40 cools to extend the fresh baked qualities of the product.

I claim:

1. A carrier for a baked dough product having a bottom crust and a moist topping, the carrier comprising: support means; a vented container for the dough product; a heat conductive plate supported by said support means, said heat conductive plate having a sufficient heat capacity and being heated to a sufficient temperature to maintain the temperature of the crust greater than the temperature of the moist topping, said vented container having vents for exhausting moist air from the interior of said container so that the temperature of air adjacent the moist topping on the dough product is maintained above the dewpoint of air in said container to prevent condensation of moisture.

2. A carrier according to claim 1, said heat conductive plate being heated to an initial temperature and having sufficient heat capacity to complete baking and to maintain the temperature of the crust above 150° for a time period of at least 30 minutes.

3. A carrier according to claim 1, said heat conductive plate being in thermally conductive contact with said dough product, said heat conductive plate having an irregular surface so that moist air is exhausted from the bottom surface of the dough product to maintain the bottom crust of the dough product dry.

4. A carrier according to claim 1, said heat conductive plate having generally radially extending grooves formed therein through which steam migrates outwardly from a central portion of the dough product.

5. A carrier according to claim 1, said heat conductive plate having a corrugated upper surface configured to support the dough product on upwardly extending ridges and to exhaust moist air through grooves between said ridges.

6. A carrier according to claim 1, said support means comprising: a base plate.

7. A carrier according to claim 6, said base plate comprising: a sheet of thermal insulator material.

8. A carrier according to claim 6, said base plate comprising: spaced sheets of rigid plastic material; and insulator material between said spaced sheets.

9. A carrier according to claim 1, with the addition of: means supporting said heat conductive plate spaced from said support means and insulation means between said heat conductive plate and said support means.

10. A carrier according to claim 1, with the addition of: a heat conductive coating on the upper surface of said heat conductive plate, said heat conductive coating having grooves formed thereon to permit circulation of air between said heat conductive plate and the dough product.

11. A carrier according to claim 1, said heat conductive plate having a corrugated metallic upper surface, said corrugated surface having upwardly extending ribs for supporting a dough product and grooves formed between said upwardly extending ribs to permit circulation of air between the crust of the dough product and said heat conductive plate.

12. A carrier according to claim 1, said vented container comprising: a thermally insulated receptacle having a top, a bottom, sides and ends, said receptacle having an exhaust opening formed therein positioned to exhaust moist air from the interior of the receptacle adjacent said top of the receptacle.

13. A carrier according to claim 12, said receptacle having an inlet opening positioned to draw air from outside the receptacle adjacent said bottom of the receptacle.

14. A portable carrier for a baked dough product having a bottom crust and a moist topping comprising: support means; a partially baked dough product, a container for the partially baked dough product; and heat conductive plate supported by said support means, said heat conductive plate having a sufficient heat capacity and being initially heated to a temperature greater than 225° F. to initially heat the bottom of the partially baked dough product to finish baking the crust and to maintain the temperature of the crust greater than the temperature of the moist topping.

15. A carrier according to claim 4, said heat conductive plate having sufficient heat capacity to maintain the temperature of the crust above 150° for at least fifteen minutes.

16. A carrier for a baked dough product having a bottom crust and a moist topping comprising: heat conductive support means having a sufficient heat capacity and being heated to a sufficient temperature to maintain the temperature of the dough product above a predetermined temperature for a predetermined period; and a vented container for the dough product, said container having a top, a bottom, sides and ends, said vented container having vents for exhausting moist air from the interior of said container so that the temperature of air adjacent the moist topping on the dough product is maintained above the dewpoint of air in said container to prevent condensation of moisture on the dough product.

17. A carrier according to claim 16, said heated support means comprising: a heat conductive plate heated to an initial temperature of greater than 300° F. and having sufficient heat capacity to maintain the temperature of the crust above 212° for a time period of at least 45 minutes.

18. A carrier according to claim 16, said bottom of said container having a perforated and irregular surface for exhausting moist air from below the bottom surface of the dough product to maintain the bottom crust of the dough product dry.

19. A carrier for a partially baked dough product having a bottom crust and a moist topping comprising: support means; a vented container for the partially baked dough product; heater means supported by said support means, said heater means for initially heating the bottom of the partially baked dough product to a temperature greater than 250° F. to finish baking the crust of the dough product, said heater means gradually reducing heat transfer to the dough product to maintain the temperature of the crust greater than the temperature of the moist topping, said vented container having vents for exhausting moist air from the interior of said container so that the temperature of air adjacent the moist topping on the dough product is maintained above the dewpoint of air in said container to prevent condensation of moisture and to draw air from outside said container to expel moisture from adjacent the bottom crust.

20. A carrier according to claim 1, said heat conductive plate heated to an initial temperature above 150° F. and having sufficient heat capacity to initially heat the bottom of a partially baked dough product to finish baking the dough product and to maintain the temperature of crust on the dough product greater than the temperature of a moist topping on the dough product, said heat conductive plate having a surface configured to permit air flow between the dough product and the surface.

* * * * *